Dec. 9, 1930. E. A. NELSON ET AL 1,784,307
COMBINED DENTAL LATHE AND VIBRATOR
Filed Feb. 21, 1929
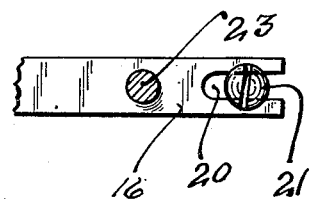
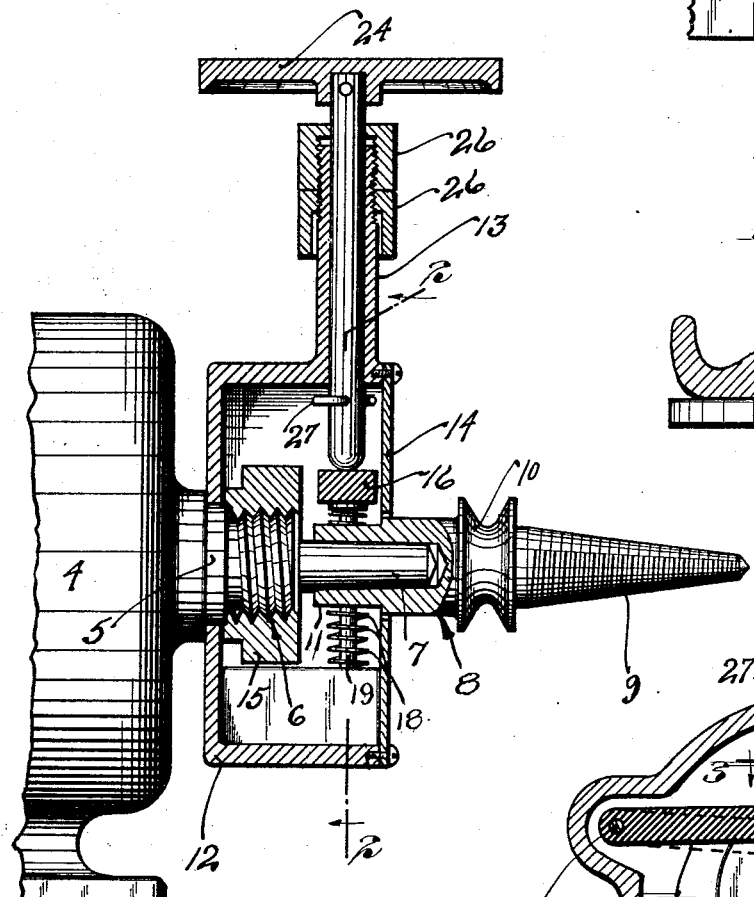
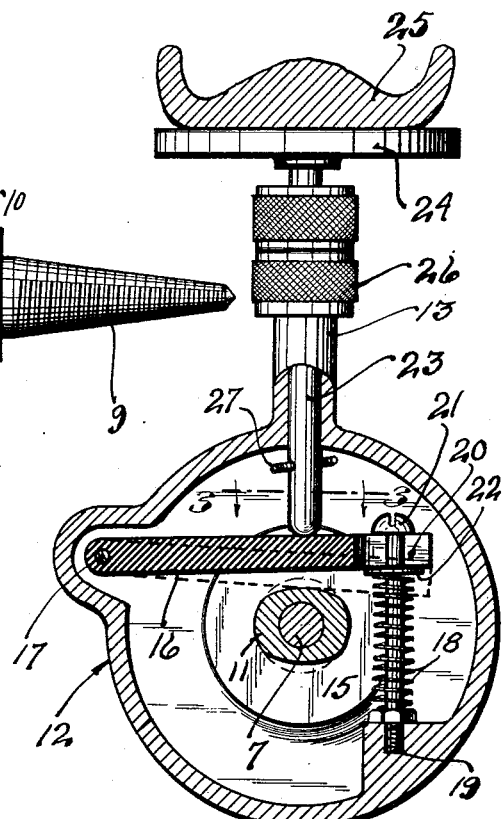
Inventors
Earl A. Nelson
Charles E. Larson
By their Attorneys
Merchant & Kilgore Patented Dec. 9, 1930

1,784,307

UNITED STATES PATENT OFFICE

EARL A. NELSON, OF MINNEAPOLIS, AND CHARLES E. LARSON, OF ST. LOUIS PARK, MINNESOTA

COMBINED DENTAL LATHE AND VIBRATOR

Application filed February 21, 1929. Serial No. 341,632.

Our present invention provides an improved dental machine which in its preferred embodiment is in the nature of a combined dental lathe and vibrator. In fact, the greater novelty of the invention is involved in an arrangement wherein an efficient vibrator is provided as an attachment to a dental lathe.

Generally stated, the invention consists of the novel devices, combinations of devices and arrangement of parts hereinafter described and defined in the claims.

Referring to the drawings, wherein like characters indicate like parts throughout the several views:

Fig. 1 is a view partly in elevation but chiefly in vertical section illustrating the invention;

Fig. 2 is a section taken on the line 2—2 of Fig. 1 some parts being shown in full; and Fig. 3 is a fragmentary detail in section taken on the line 3—3 of Fig. 2.

Of the parts of the dental lathe the numeral 4 indicates a small electric motor, the outer shell of which is provided with a shoulder 5 and an externally threaded hub 6. The numeral 7 indicates a projecting motor shaft or spindle driven by the rotor of the motor and the outer portion of which is preferably slightly tapered towards its outer end so as to frictionally fit within a correspondingly tapered seat of a sleeve-like chuck 8. As is usual, the chuck 8 has an outwardly tapered externally threaded end portion 9 upon which various kinds of dental devices may be applied that are to be turned or otherwise treated on the lathe. The chuck 8 is also preferably equipped with a small pulley 10 from which dental devices may be driven.

In carrying out this invention the inner end portion of the chuck 8 is formed or otherwise provided with a cam-acting portion 11 which, as shown, is oval in cross section so that it will act as a tappet under rotation of the chuck. The main parts of the vibrator are mounted in a small casing 12 having a vertically extended plunger guiding sleeve 13 and a detachable outer side plate 14. The solid back of this casing has a simple perforation that snugly fits the reduced portion and against the shoulder 5 of the hub of the motor casing, as best shown in Fig. 1.

The numeral 15 indicates a knurled nut that works on the threaded hub 6 and which when tightened rigidly clamps the casing 12 to the motor casing with its sleeve 13 extending upright. The numeral 16 indicates a vibrator arm or rocker located within the casing 12, extended well above the shaft 7 and pivotally attached to the wall of the casing 12 at 17. The free end of the arm 16 is yieldingly held upward by a coiled spring 18 placed around a retaining post or bolt 19 the lower end of which is threaded into the bottom of the casing 12 and hence is vertically adjustable. The upper end portion of post 18 works through a slot 20 in the end of arm 16 and the head 21 of said post limits the upward movement of said arm. As shown, the upper end of spring 18 presses a washer 22 against the arm 16.

Working vertically through a guide sleeve 13 and resting on the intermediate portion of arm 16 is a plunger 23 which at its upper end is provided with a small table 24 preferably of disc-like form and which is adapted to support a dental mold or impression 25. The upper end of sleeve 13 is threaded and working thereon is a stop device shown in the form of a pair of lock nuts 26. The upper lock nut limits the extreme downward movement of the plunger 23 and table 24. A stop pin 27 passed through the plunger 24 below the top of the casing 12 limits the extreme upward throw of the plunger 23.

By reference to Fig. 1 it will be noted that the chuck 8 works freely through a central perforation in the detachable head plate 14 and that the cam-acting portion 11 is located within said casing in position for action on the arm 16 to vibrate the same under rotation of the chuck. The proper adjustment and normal positions of the parts as shown in Figs. 1 and 2 and under these normal conditions when the chuck is rotated the cam 11 will not engage arm or rocker 16 and the device may be used as a lathe or for driving another device from the belt running over pulley 10. When the device is to be used as a vibrator the mold is placed on the table 24 and the operator presses down on the mold so as to depress arm 16 into the zone of action of the cam surface 11 and thereupon rapid vibratory movements such as required for proper tamping or filling of the mold will be produced and as soon as the mold is relieved from the downward pressure of the hand, the parts will assume their normal positions of rest shown in the drawings.

The extent of the vibration produced on the table 24 may be varied by vertical adjustments of the lock nuts or stop elements 26. If said nuts are adjusted so that an extreme downward pressure is produced the arm 26 will be forced only slightly within the circle of operation of the cam surface 11 then very short and light vibration will be produced. Maximum vibration will be produced when nuts 26 are so adjusted that under extreme downward pressure arms 16 will be forced into engagement with cam surface 11 when said cam surface is in the position shown in Fig. 2 and, of course, vibrations of intermediate extent or intensity can be produced by intermediate adjustments of said nuts.

The utility of this device has been demonstrated in practice. The device stands in condition always for use either as a lathe or a vibrator and the use of the one purpose does not interfere for the use of the other purpose and no adjustments are required to adapt the device for the one use or the other.

What we claim is:

1. A dental vibrator comprising a casing, a motor driven tappet-acting cam within said casing, a rocker pivotally mounted within said casing and yieldingly held out of the zone of action of said cam but depressible into the zone of action, and a table having a plunger working vertically through said casing and resting on the rocker and said rocker being movable into the zone of action of said cam through said plunger and table.

2. A dental vibrator comprising a casing, a motor driven tappet-acting cam within said casing, a rocker pivotally mounted within said casing and yieldingly held out of the zone of action of said cam but depressible into the zone of action, and a table having a plunger working vertically through said casing and resting on the rocker and said rocker being movable into the zone of action of said cam, and means for limiting the downward movement of said table and plunger and the extent of movement of said rocker into the zone of action of said cam.

3. An electric motor comprising a casing having a hub and a rotor shaft projecting through said hub, of a chuck detachably mounted on the projecting end of said rotor shaft and provided on its inner portion with a tappet-acting cam, a casing detachably applied on said hub, said casing having a vertical plunger guiding sleeve, an upwardly spring-pressed rocker arm pivotally mounted in said casing normally out of the zone of action of said tappet-acting cam but arranged to be depressed into the zone of action thereof, and a vibrator table having a plunger working through the guide sleeve of said casing and resting on said rocker arm.

4. An electric motor comprising a casing having a threaded hub and a rotor shaft projecting through said hub, of a chuck detachably mounted on the projecting end of said rotor shaft and provided on its inner portion with a tappet-acting cam, a casing detachably applied on said threaded hub, a nut applied to said threaded hub and rigidly securing said casing thereto, said casing having a vertical plunger guiding sleeve, an upwardly spring-pressed rocker arm pivotally mounted in said casing normally out of the zone of action of said tappet-acting cam but arranged to be depressed into the zone of action thereof, and a vibrator table having a plunger working through the guide sleeve of said casing and resting on said rocker arm.

5. An electric motor comprising a casing having a hub and a rotor shaft projecting through said hub, of a chuck detachably mounted on the projecting end of said rotor shaft and provided on its inner portion with a tappet-acting cam, a casing detachably applied on said hub, said casing having a vertical plunger guiding sleeve, an upwardly spring-pressed rocker arm pivotally mounted in said casing normally out of the zone of action of said tappet-acting cam but arranged to be depressed into the zone of action thereof, and a vibrator table having a plunger working through the guide sleeve of said casing and resting on said rocker arm, and an adjustable stop on said plunger guiding sleeve for varying the downward movement of said table and hence the movement of said rocker arm into the zone of action of said cam.

In testimony whereof we affix our signatures.

EARL A. NELSON.
CHARLES E. LARSON.